US009477898B2

(12) United States Patent
Kacher et al.

(10) Patent No.: US 9,477,898 B2
(45) Date of Patent: *Oct. 25, 2016

(54) STRAIGHTENING OUT DISTORTED PERSPECTIVE ON IMAGES

(71) Applicant: ABBYY Development LLC, Moscow (RU)

(72) Inventors: Olga Kacher, Moscow (RU); Vladimir Rybkin, Moscow (RU)

(73) Assignee: ABBYY Development LLC (RU)

( * ) Notice: Subject to any disclaimer, the term of this patent is extended or adjusted under 35 U.S.C. 154(b) by 159 days.

This patent is subject to a terminal disclaimer.

(21) Appl. No.: 14/315,403

(22) Filed: Jun. 26, 2014

(65) Prior Publication Data

US 2014/0307967 A1 Oct. 16, 2014

Related U.S. Application Data

(63) Continuation of application No. 13/561,242, filed on Jul. 30, 2012, now Pat. No. 8,885,972, which is a continuation of application No. 13/341,912, filed on Dec. 31, 2011, now abandoned, which is a continuation-in-part of application No. 12/062,179, filed on Apr. 3, 2008, now Pat. No. 8,107,766.

(51) Int. Cl.
*G06K 9/32* (2006.01)
*G06T 3/00* (2006.01)
*G06K 9/46* (2006.01)
*G06T 5/00* (2006.01)
*G06T 7/00* (2006.01)

(52) U.S. Cl.
CPC ........... *G06K 9/3283* (2013.01); *G06K 9/4604* (2013.01); *G06T 3/0031* (2013.01); *G06T 5/001* (2013.01); *G06T 7/0081* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,191,438 A * | 3/1993 | Katsurada | G06K 9/3283 358/488 |
| 5,751,461 A | 5/1998 | Chen et al. | |
| 5,848,197 A | 12/1998 | Ebihara | |
| 5,940,544 A * | 8/1999 | Nako | H04N 1/00681 358/496 |
| 6,665,128 B1 | 12/2003 | Tai | |
| 6,968,094 B1 * | 11/2005 | Gallagher | G06K 9/209 348/E5.046 |
| 6,996,290 B2 | 2/2006 | Cariffe | |
| 7,016,081 B2 | 3/2006 | Araki et al. | |
| 7,072,527 B1 | 7/2006 | Nako | |
| 7,170,644 B2 | 1/2007 | Loce et al. | |
| 7,215,445 B2 | 5/2007 | Braudaway et al. | |
| 7,417,765 B2 | 8/2008 | Araki | |

(Continued)

OTHER PUBLICATIONS

Faisal, Shafait et al., "Document Image Dewarping Contest", 2nd Int. Workshop on Camera-Based Document Analysis and Recognition (CBDAR), (2007).

(Continued)

*Primary Examiner* — Tsung-Yin Tsai
(74) *Attorney, Agent, or Firm* — Veronica Weinstein

(57) ABSTRACT

Methods for correcting distortions in an image including text, or an image of a page that includes text, are disclosed. The methods include identifying reliable and substantially straight lines from elements in the image. Vanishing points are determined from the lines. Parameters associated with a rectangle are determined. A coordinate conversion is performed.

39 Claims, 11 Drawing Sheets

(56) References Cited

U.S. PATENT DOCUMENTS

| | | | |
|---|---|---|---|
| 7,477,426 B2 | 1/2009 | Guan et al. | |
| 7,630,581 B2 * | 12/2009 | Kojima | G06K 9/3283 382/290 |
| 8,170,368 B2 * | 5/2012 | Yin | G06K 9/3283 382/113 |
| 2002/0149808 A1 * | 10/2002 | Pilu | H04N 1/387 358/530 |
| 2003/0026482 A1 * | 2/2003 | Dance | G06K 9/325 382/199 |
| 2005/0175239 A1 * | 8/2005 | Araki | G06K 9/3283 382/177 |
| 2005/0225808 A1 | 10/2005 | Braudaway et al. | |
| 2008/0260256 A1 * | 10/2008 | Zeng | G06K 9/3283 382/195 |
| 2010/0014782 A1 * | 1/2010 | Fero | H04N 1/387 382/290 |
| 2011/0044554 A1 * | 2/2011 | Tian | G06T 5/003 382/255 |

OTHER PUBLICATIONS

Zhang, Lei et al., "Restoring Warped Document Images through 3D Shape Modeling", vol. 28, No. 2, Feb. 2006, 195-208, IEEE Trans. Pattern Anal. Mach. Intell., (2006).

* cited by examiner

STRAIGHTENING OUT DISTORTED PERSPECTIVE ON IMAGES

CROSS-REFERENCE TO RELATED APPLICATIONS

For purposes of the USPTO extra-statutory requirements, the present application constitutes a continuation of co-pendinq U.S. patent application Ser. No. 13/561,242 that was filed on Jul. 30, 2012, which is a continuation of U.S. patent application Ser. No. 13/341,912 that was filed on 31 Dec. 2011, now abandoned, which is a continuation-in-part of U.S. patent application Ser. No. 12/062,179 that was filed on 3 Apr. 2008, which issued on Jan. 31, 2012 as U.S. Pat. No. 8,107,766.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but points out that the designations are not to be construed as commentary or admission as to whether or not the present application contains any new matter in addition to the matter of its parent application(s).

All subject matter of the Related Application(s) and of any and all parent, grandparent, great-grandparent, etc. applications of the Related Applications is incorporated herein by reference to the extent such subject matter is not inconsistent herewith.

BACKGROUND OF THE INVENTION

1. Field

The present invention relates to image processing that is typically performed before character recognition processes, and in particular to systems, devices and methods for detecting and attempting restoration of images with distorted perspective and distorted lines of text.

2. Related Art

Optical character recognition (OCR) is a technology that converts scanned or photographed images with text into machine-editable and searchable text—encoded text.

Photographing a page often results in a distorted perspective or geometric distortion of the page. FIG. 1A shows a distorted photographed image of a single page of a document. For example, distortions can lead to deformation of relative proportions of objects in an image and/or parallelism errors.

Scanning or photographing a document page from a thick bound volume often results in various distortions of the image, e.g., text lines become distorted in areas close to the spine of the book. FIG. 1B shows a scanned image of two pages (double page spread) of a thick book opened near its middle. Geometric distortion or warping near the spine area indicated by reference numeral (110) is visible. This distortion may be caused by book pages not being in uniform intimate contact with the scanning surface or platen surface of a scanner. For example, portions of book pages that are near the spine of the book are usually the portions that are not in intimate contact with the platen surface. Accordingly, distortion occurs in parts of the image corresponding to these portions. These distortions prevent the correct recognition of words located in close proximity to the binding edge of a book.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter, as well as a preferred mode of use, are best understood by reference to the following Detailed Description of illustrative embodiments and implementations when read in conjunction with the accompanying drawings.

FIGS. 4A-4C illustrate the steps of a method for correcting a distorted image, in accordance with one embodiment of the invention.

DETAILED DESCRIPTION

While the invention is described below with respect to one or more exemplary or preferred embodiments and implementations, other embodiments and implementations are possible. The concepts disclosed herein apply equally to other systems, devices and methods for detecting and attempting restoration of images with distorted perspective and distorted lines of text.

Figure 1A:
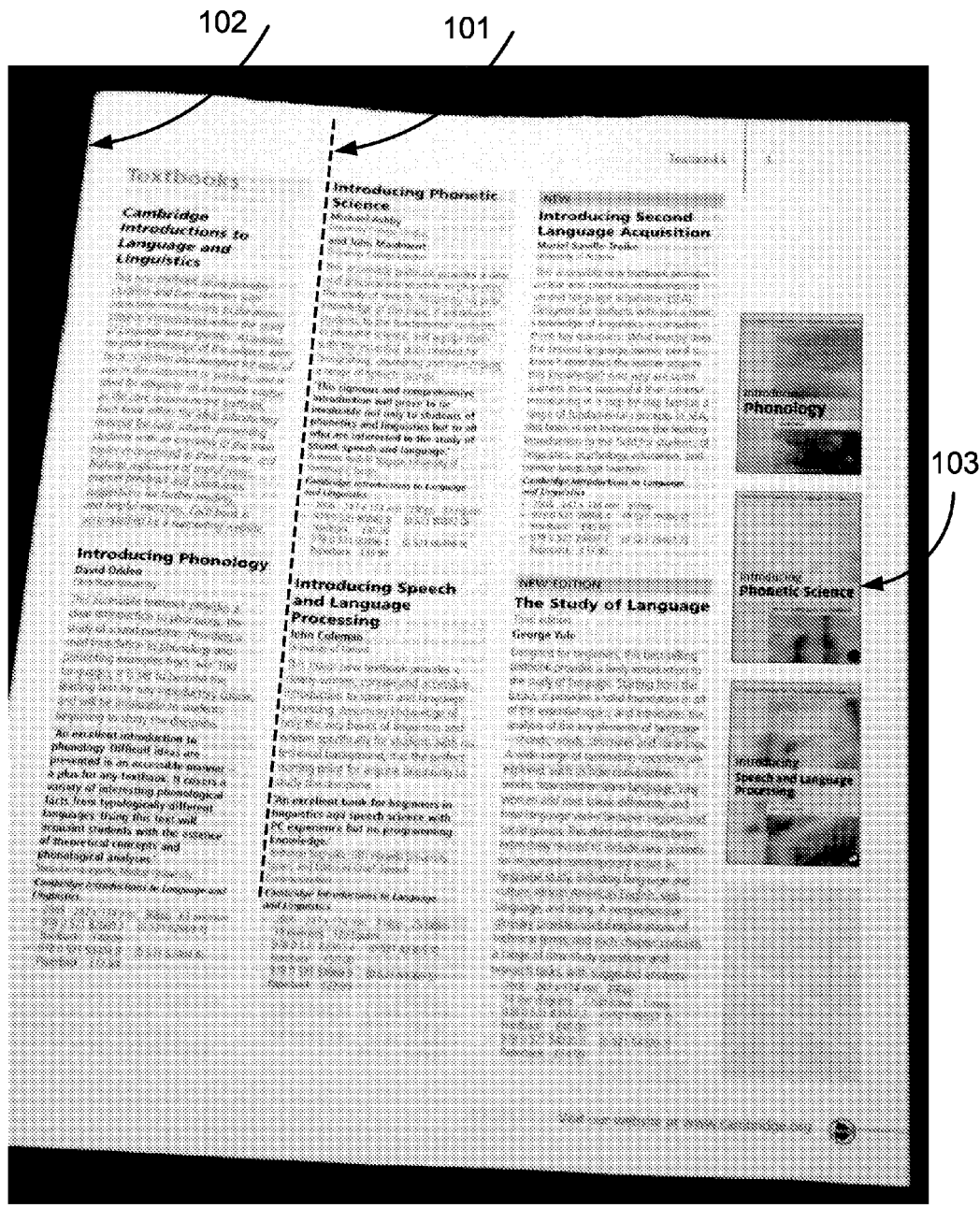
FIG. 1A is a photographed image of a single page with typical perspective distortions.
Figure 1B:
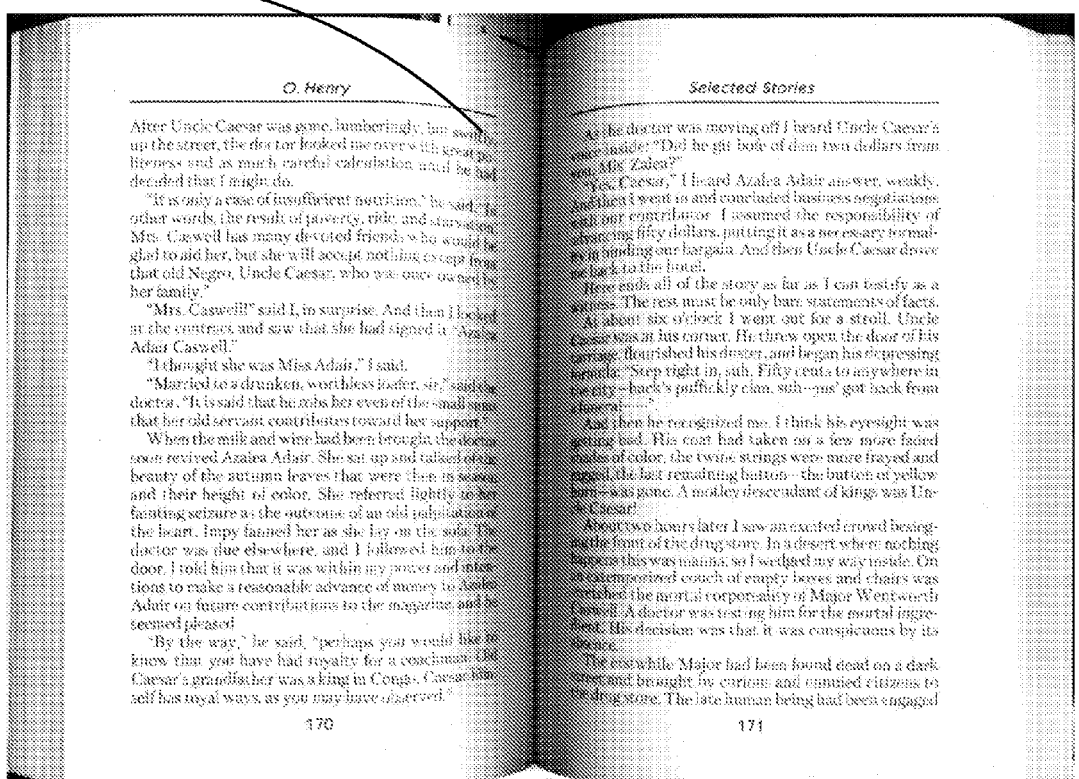
FIG. 1B is an image of a book page with typical distortions at the binding edge (110).

In one implementation, the invention discloses a method for correcting distortions in a scanned or photographed image ("distorted image") of a page or a double page spread. By way of example, FIG. 1A shows an image corresponding to a single page of a document where the image perspective is distorted. For example, perspective distortion may occur due to distance differences between various points on the page and a lens. FIG. 1B illustrates another manifestation of distortion: a scan of a double page spread of a book in which distortions can be seen in the area indicated by reference 110. Distortion manifests as distorted text lines and are caused by portions of a page near the spine of a book not being in intimate contact with a platen surface of a scanner used to scan the page or pages.

Perspective distortions of the image are corrected by calculating distortion parameters and straightening out the perspective and text lines based on these parameters. Distortion parameters are calculated using the results of an image analysis during which objects in the image (e.g. text, pictures, separators, tables) are identified and classified.

Figure 2A:
FIG. 2A is an image obtained or derived from the image shown in FIG. 1A by straightening out perspective distortions.
Figure 2B:
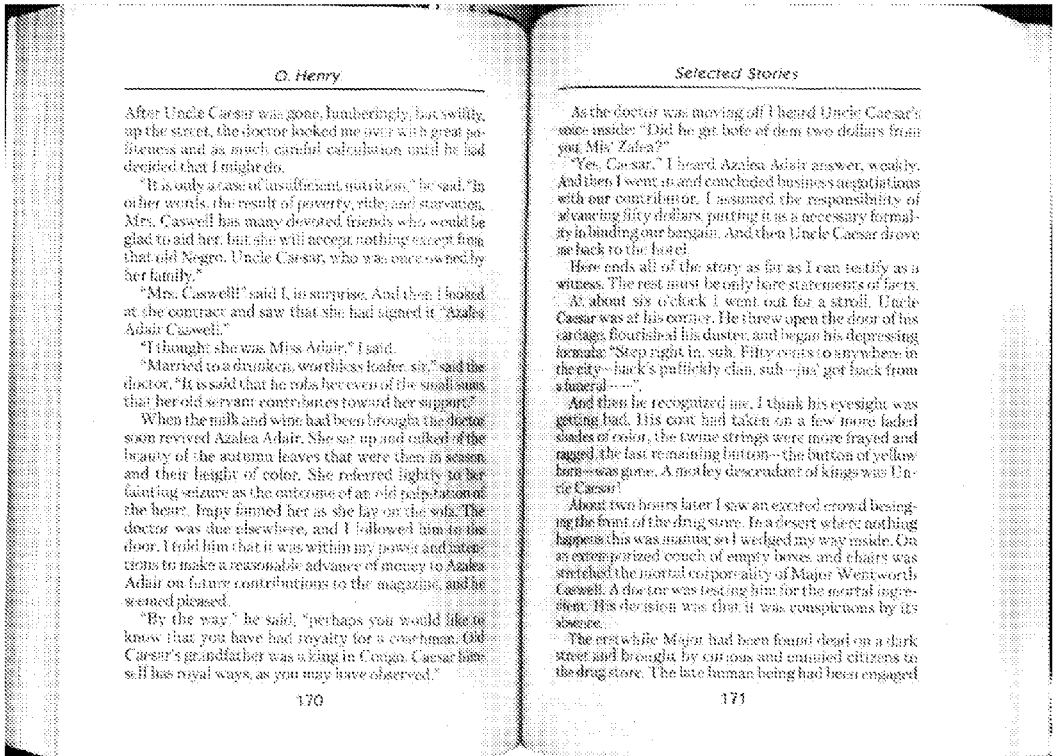
FIG. 2B is an image obtained or derived from the image shown in FIG. 1B by applying the method(s) described herein for straightening out distorted text lines; the distortions at the binding edge have been substantially corrected.

In accordance with the method, a new or corrected image is created onto which dots or pixels from the distorted image are then transferred in such a way as to straighten out the distorted perspective and text lines. FIG. 2A and FIG. 2B show corrected images based on the images from FIG. 1A and FIG. 1B and which were generated using techniques of the present invention.

Figure 3A:
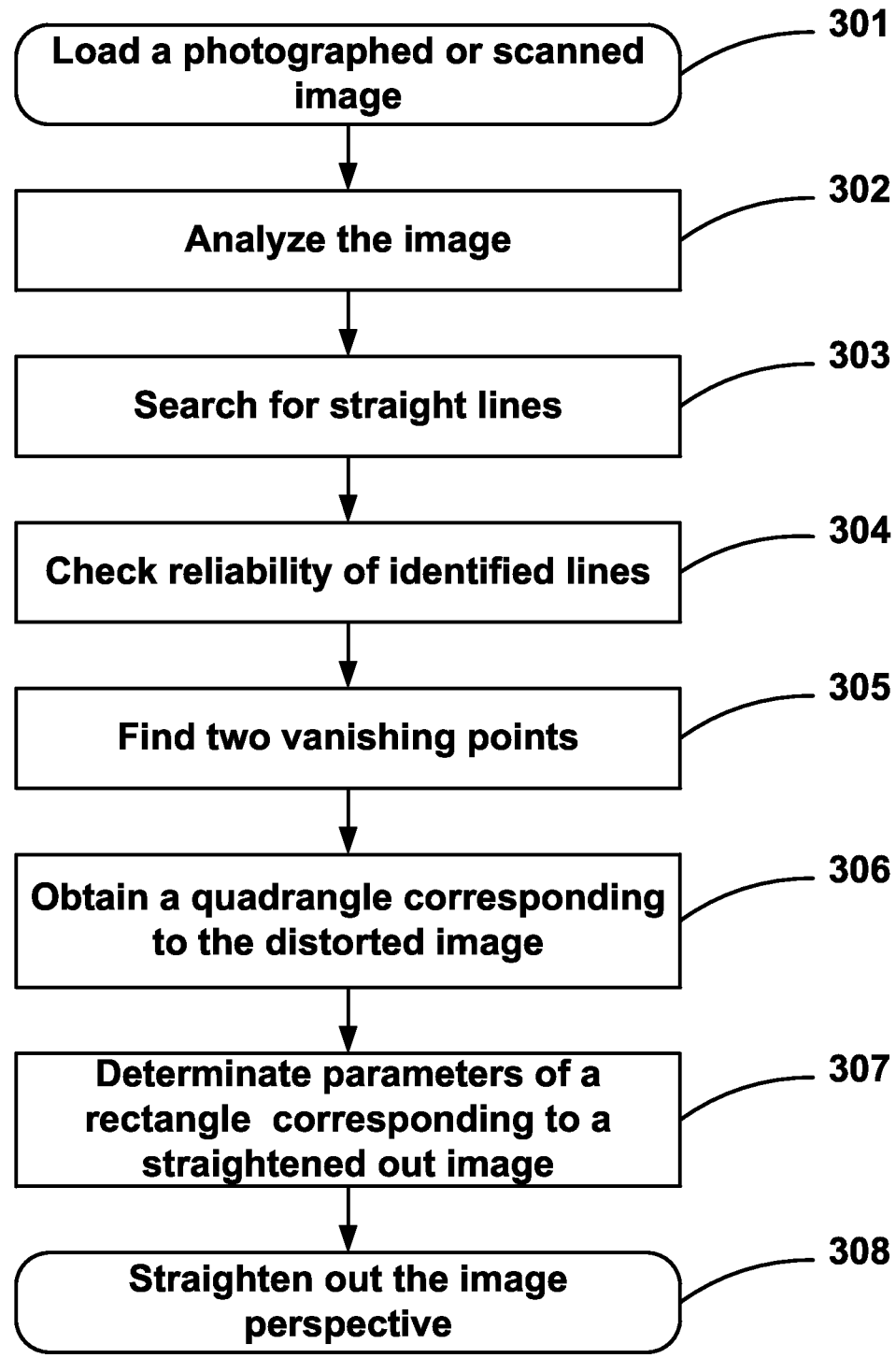
FIG. 3A shows a flowchart of a method for correcting a distorted image, in accordance with one embodiment of the invention.

Turning now to FIG. 3A, there is shown a flowchart of a method for correcting distortions, in accordance with one embodiment of the invention. At 301, a scanned or photographed image of a page is fed into a system or loaded into memory of a system, which in one embodiment may be a general purpose computer (system) enabled by software, firmware or instructions to perform the method for correcting distortions of the present invention. An example of such a system is shown FIG. 5. The images from FIGS. 1A and 1B serve as an example of a photographed image.

Then the image is analyzed (302) and objects in the image are detected and classified. Classified objects from an image are used to calculate distortion parameters of perspective. These calculations are based on two vanishing points, the vertical and the horizontal. A vanishing point is a point in infinity located on the intersection of parallel lines in a perspective representation. An example of horizontal vanishing point (500) is shown on FIG. 5. Once these points have been identified, a quadrangle with the shape of the perspective distortion is built on the image. Then, coordinate conversion can transform the quadrangle into a rectangle by a performing a computation, thus straightening out the perspective of the image.

A horizontal or vertical vanishing point is defined by finding, respectively, horizontal or vertical straight lines in the image (303). A vanishing point is located on the intersections of these lines (305).

Straight lines can be found using various objects on the image. With reference to FIG. 1A, lines can be found along separators, edges of text (101), edges of the document (102), edges of rectangular pictures (103), text lines, table separators, etc. Using text edges is not as reliable as, for example, separators, because often text is not aligned to both sides, and the unaligned side or sides will cause lines to be found incorrectly, which in turn leads to errors in finding perspective. Therefore, first, the most reliable objects should be used to find straight lines, and, second, if it is insufficient, then less reliable objects may be added for finding lines and other objects. The method then can continue adding objects that provide successively less accuracy in finding straight lines.

In the present disclosure, for example, separators are used at first when looking for straight lines because they may provide the most accuracy in an image. Generally, lines found based on black separators, if present in the image, are the most reliable objects to use for identifying lines. Such objects are usually identified during a document analysis stage and can be used for finding vanishing points. If this technique is insufficient (separators are not found or do not satisfy certain criteria), text elements or text objects identified during a document analysis are used to find lines or additional lines for use in finding vanishing points. If finding additional lines along edges of text also turns out to be insufficient, a search for any other clearly traced straight lines in the image may be conducted.

A variety of suitable method can be used to search for straight lines. For example, a method involving a Hough transform may be used. In one embodiment, the following steps are performed to extract results from a Hough transform accumulator and eliminate superfluous data:
  preliminarily filtering the Hough transform accumulator;
  calculating a threshold value for extracting lines from the accumulator;
  threshold filtering of the accumulator (points higher than the threshold value represent identified straight lines).

Preliminary filtration is carried out in order to locate or indicate the peaks in the accumulator more clearly by suppressing surrounding clouds of points with similar values. For instance, a filter that suppresses all points in the accumulator that are not local maximums may be used (i.e., non-maximal suppression filtration). This filter is applied to a set area (e.g., a 5 pixel×5 pixel area) and decreases the value (weight) of non-maximal points (e.g., by a factor of 2).

Threshold filtration parameters, including the threshold value, may be either predefined or calculated to fit the specifics of the accumulator. In the later case, the threshold can be calculated based on a greatest maximum, for example the threshold can be twice as small as this maximum.

The accumulator is then filtered using the threshold value. Points above the threshold value represent one or more identified straight lines.

In order to achieve greater accuracy, the Hough transform may be applied only to points where a straight line is expected instead of every point in the image (i.e., points for the accumulator are selected using a mask).

Thus, points from separator objects identified during the document analysis may be added to the Hough transform accumulator. In one implementation, further calculations are only performed with these points. Putting all points of the separator in the Hough Transform accumulator is undesirable, input should generally only include the central line of the separator. In an RLE (run-length encoding) presentation, this line is drawn through the middle of horizontal strokes for a vertical separator, and through the middle of vertical strokes for a horizontal separator. (RLE refers to a general form of image information compression for storage.) In other words, if a separator is wider than one pixel, the accumulator should only include points from a line that is one pixel wide and runs through the center of the separator. This is done in order to simplify the search for maxima in the accumulator.

Once this is complete, maxima in the accumulator array are identified and lines are extracted.

Another way to find straight lines is searching and identifying lines along an edge of text (101) as shown in FIG. 1A. Usually, such lines are limiting lines that are imaginarily drawn along the edges of a text column. The lines along the left and right edges of text should be searched and identified separately in order to avoid mistakes.

Text objects found during the document analysis are analyzed. Small objects and text objects that cross transversally over, in, into or through pictures, watermarks and the like are filtered out. The horizontal distance between each found text object and its neighboring text objects, called the lateral interval, is calculated. Next, the points in the middle of the right or left sides of rectangles enclosing the found text objects (depending on which respective side is used to search for lines) are added to a Hough transform accumulator array, such as by adding one point for every text object.

The weight of each point is proportional to its lateral interval (i.e., distance between this text object and its respective neighboring text object).

Points of objects with greater or larger lateral intervals generally have more weight in the Hough map. Thus, a line that runs along the edge of the body of text may be found.

Figure 3B:
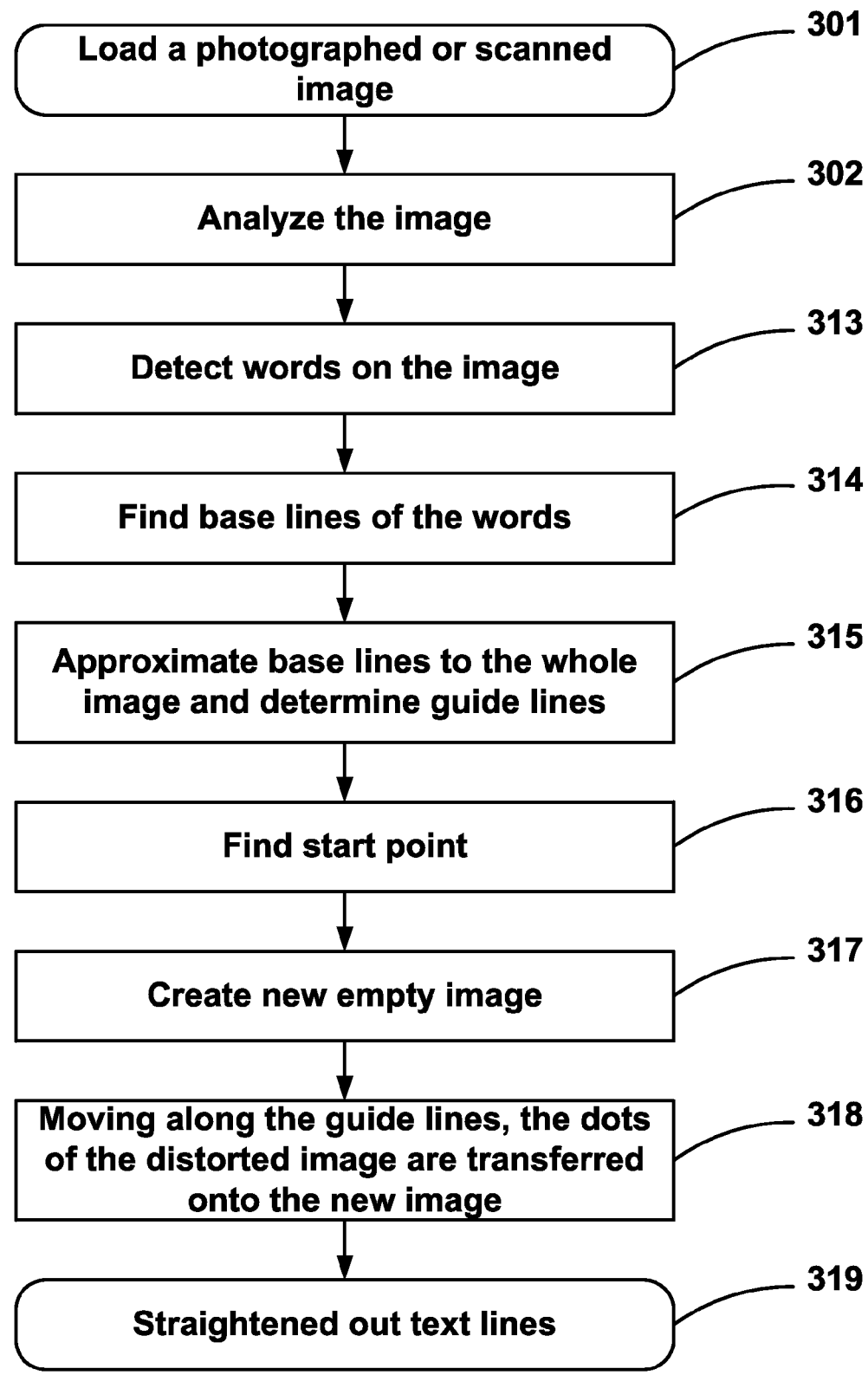
FIG. 3B shows a flowchart of a method for correcting a distorted image, in accordance with one embodiment of the invention.
Figure 4A:
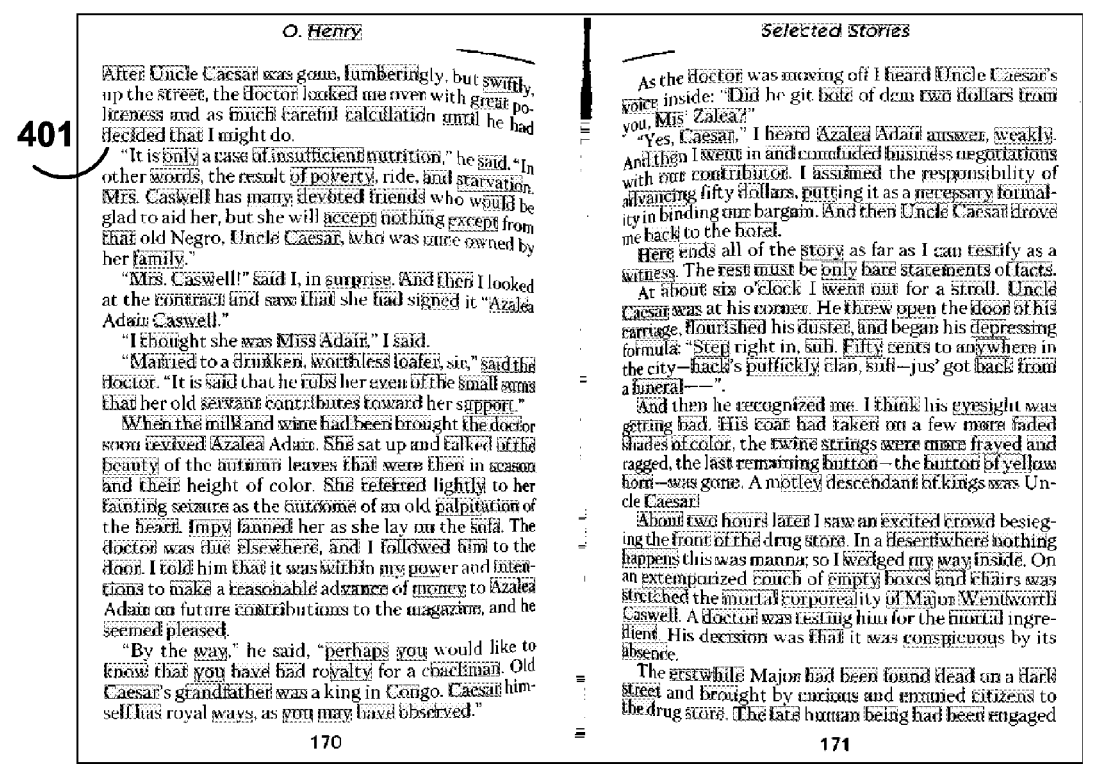
Figure 4B:
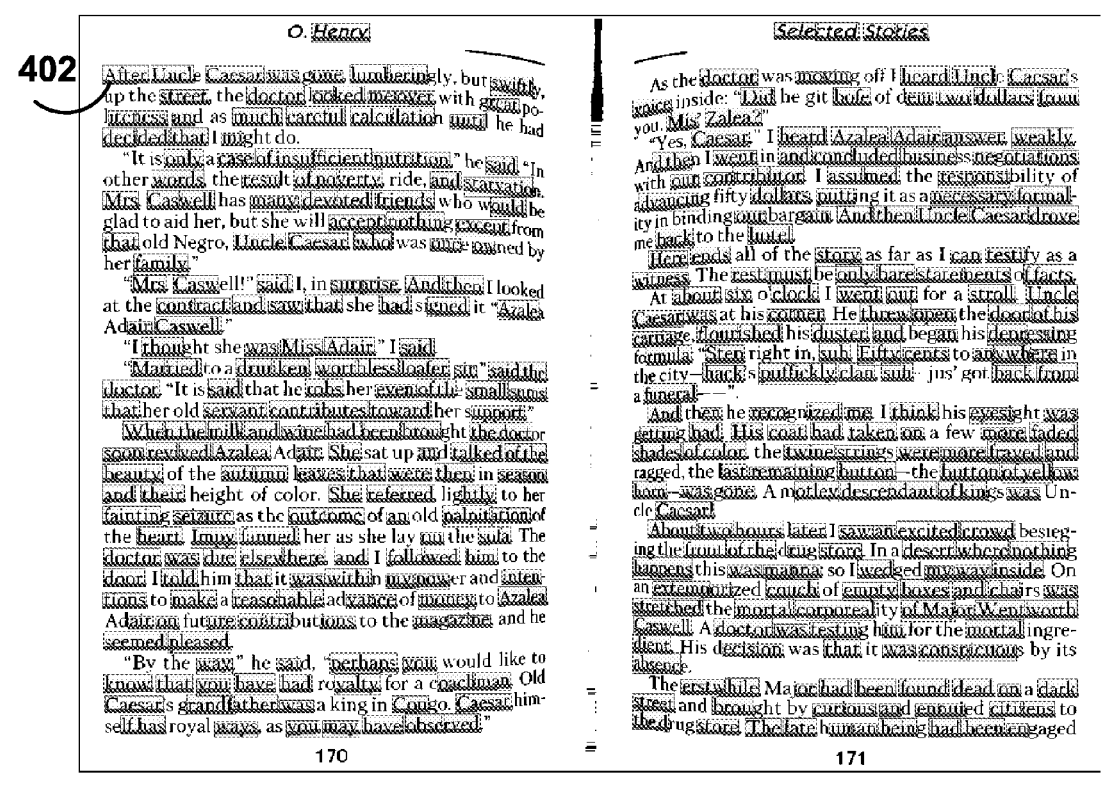
Figure 4C:
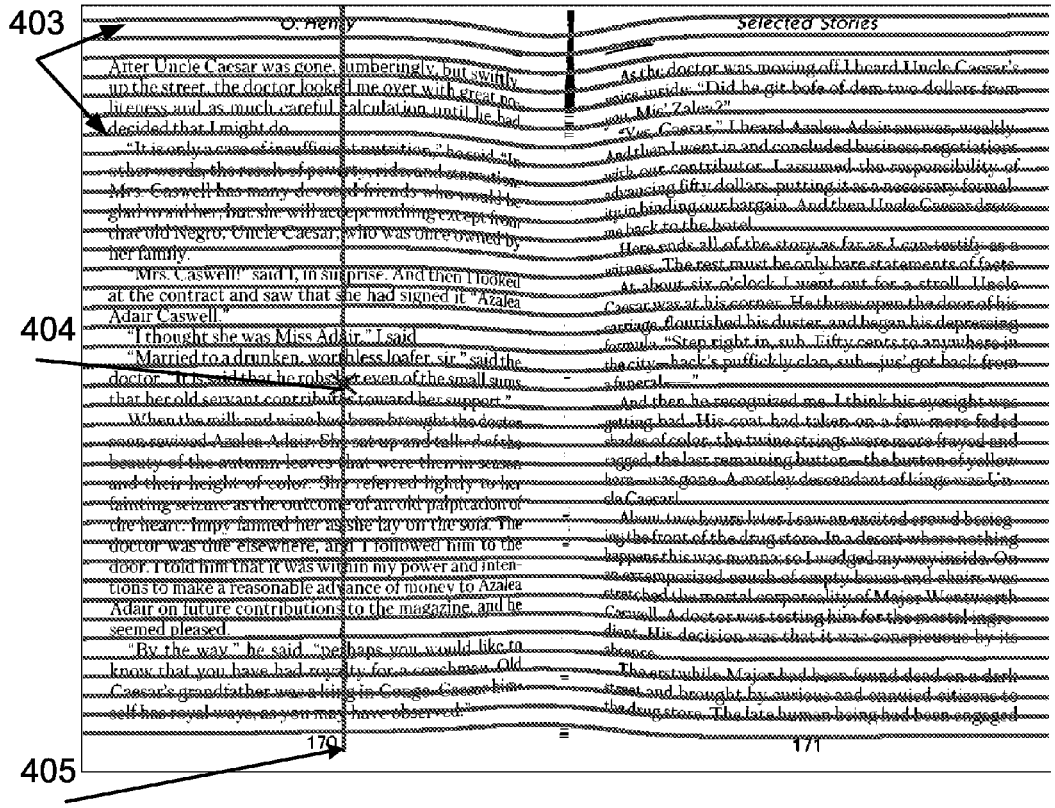

A search mechanism for a text baseline is used to find horizontal lines based on one or more lines of text. It can be seen that the images of pages with lines of text shown in FIG. 1A and FIG. 1B include multiple sets of words corresponding to each line of text. For identifying the multiple sets of words, the image is analyzed (302) and all possible objects (e.g., characters or combination of characters) are detected based on the mutual arrangement of the black and white dots, or color dots of a color image. The characters or combination of characters may be found with a layout analysis or with one or more segmentation algorithms. Subsequently, as indicated in FIG. 3B, detected characters may be joined into words 313, which may be described as detecting words in the image 313. FIG. 4A shows a representation of the image shown in FIG. 1B where the words or text elements 401 are detected on or in the image shown in FIG. 1B. Many of the words 401 are bounded by a rectangle or shape showing segmentation of each text object or word 401.

Again with reference to FIG. 3B, for each detected word or part of a word, its baseline is detected (314). A baseline is a line on or near which the characters of the given word are located. FIG. 4B shows baselines (402) of words detected on the image. If the image is distorted (FIG. 1A and FIG. 1B show an example of such an image) and contains many words, many baselines will be or can be found, many of which may be spurious or may intersect. To lower the total amount of baselines and remove intersecting and erroneous lines, found or identified lines are clustered into groups, with a new group (cluster) created for each sufficiently different line. Clusters with few lines are eliminated. Then the remaining baselines may be approximated using at least some of the collinear elements (words) in each set applying a spatial location collection to position all collinear elements (words) in the set on or near a common horizontal rectilinear baseline.

Baselines for vertical text, if such text is present in the image, can be found in a similar fashion.

The image may also be searched for any other visible or identifiable lines or line segments. An example of a method used to accomplish this is provided below.

The image is smoothed, e.g., by a Gaussian filter, and compressed to an extent where small details are lost, but the main objects are still visible. Edges in the image are detected, e.g., by a Canny Edge Detection mechanism, thereby a mask of the image is created. This mask is searched or processed to identify straight lines using a Hough transform method. The edges of the page can be found using the same method.

Various criteria may be used to check reliability of identified lines (304), and this check may be performed at every stage of the search for lines. If a current set of lines yielded by a search is found to be unreliable, more lines may be identified and added to the set. The reliability of the resulting set may be again checked using various criteria, and so on.

Short lines are unreliable and may yield a significant margin of error when used to search for vanishing points. Due to this situation, it is beneficial to filter lines according to their length. The threshold value for such filtration may be absolute (e.g., in pixels, mm, inches), or relative (e.g., to one or more sizes related to the image).

At least two straight lines are generally required to find a vanishing point (305). If, for example, three lines were found and two of them intersect, or intersect close to the image if extended, such lines are unreliable and more lines are required to find the vanishing point.

Additionally, the following criterion may be used. It is assumed that that the lines should be a monotone sequence for an inclination angle, i.e., the inclination angles of the lines sorted by their horizontal or vertical coordinate are monotone increasing/decreasing. The lines that do not meet this criterion can be rejected as unreliable.

The vanishing point cannot be reliably calculated using lines that are almost parallel (e.g., if lines are located too close to one another), because their intersection cannot be established with a sufficient degree of confidence. The most reliable results can be achieved by calculating the intersection of remote lines, e.g., the intersection of the leftmost and the rightmost lines (or top-most and bottom-most lines).

If the left-most and the right-most or top-most and bottom-most lines intersect inside the image or somewhere close to the image boundaries, or are located very close to each other, this means that the lines have not been reliably detected and cannot be used to calculate the vanishing point.

By applying all, some or at least one of the above actions, two horizontal and two vertical lines are selected which have been detected with a greatest confidence. Then the intersection points of each pair of lines may be detected and may be assumed to be the horizontal and vertical vanishing points (305).

To straighten out the image perspective (308), it is necessary to know the coordinates of the quadrangle corresponding to the distorted image and the coordinates of the rectangle corresponding to a representation of a straightened out image. When building the quadrangle (306) and selecting the right parameters for the rectangle (307), the proportions of the figures should be selected so as not to distort the proportions of the text, which may adversely affect the quality of optical character recognition.

Figure 5:
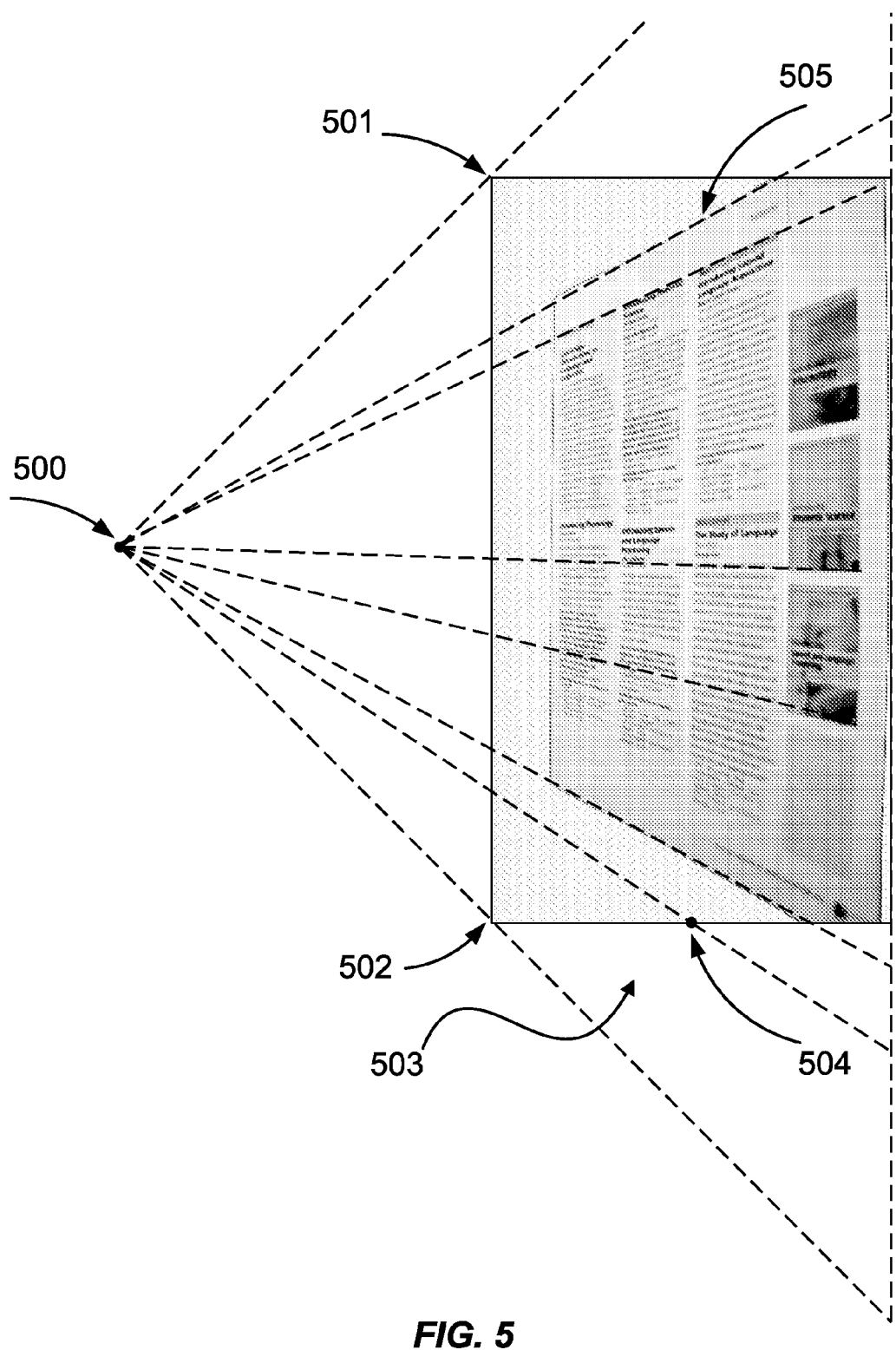
FIG. 5 illustrates a vanishing point and straight lines drawn through this vanishing point.

If the coordinates of the vanishing point are known, any number of straight lines can be drawn through this vanishing point (See FIG. 5 for an example of a vanishing point 500). The quadrangle can be obtained (306) as follows. Two lines are drawn through the vertical vanishing point and two lines are drawn through the horizontal vanishing point so that their intersection produces a quadrangle that encloses the original image or a quadrangle whose sides trace above the original image. When the image is straightened out, only the points inside the quadrangle will make it into the straight image.

If the quadrangle is built to enclose the image (i.e., lines are drawn through the vanishing point (500) and through both ends of the side of the image (501 and 502) closest to the vanishing point as shown in FIG. 5), no data from the image likely will be lost. However, if the size of the resulting rectangle is chosen correctly (lest the text shrink when the image is straightened out), the resulting image will be larger than the original image and the resulting image will contain large margins without any useful data (503).

Therefore it is best to draw the quadrangle over the image in such a way that parts of the image without any useful information are cut off. For example, lines can be drawn through the vanishing points and the middles of the lateral sides of the image (504). The cut off areas will not, most likely, contain any part of a page represented in the image, i.e., the image will not contain any useful information.

If the edges of the page were identified during the search for straight lines and if they are reliable, the sides of the rectangle can be drawn over the edges of the page (505), cutting of spurious data such as areas outside page (e.g., table space). In FIG. 2A the image of FIG. 1A is cropped by identified page edges is shown.

Next, the size of the resulting image should be determined (307). To accomplish this, it is enough to determinate a ratio of the sides of the rectangle. After the image is straightened out, a part of it will appear to be closer to a viewer, in other words it will be enlarged. The procedure used to accomplish this is described below.

First, the direction (vertical or horizontal) of the main (greatest) distortion is determined by comparing the angles between opposing sides of the quadrangle. The main distortion has the same direction as the two sides with the greatest angle between them. For example, if the angle between the right and left sides is greater than the angle between the top and bottom sides, the vertical distortion is greater than the horizontal distortion, so the vertical distortion is main distortion.

Then, if the vertical distortion is main distortion, the height of the sought-for rectangle is established to be equal to the height of the rectangle enclosing for the quadrangle, and a scale coefficient is calculated for its width. In the opposite case (where the horizontal distortion is a principal or main type of distortion), the width of the sought-for rectangle is established to be equal to the width of the enclosing rectangle and a scale coefficient is calculated for its height.

The scale coefficient may be calculated as a piecewise linear function of the angle between two opposing sides of the quadrangle (the angle formed when these sides intersect at the vanishing point; this angle determines the extent of the distortion).

For example, if the image is distorted only vertically, i.e., the quadrangle built on it is a trapezoid, and the height of the enclosing rectangle will be equal to the height of this trapezoid, and its width will be equal to its longest base. The scale coefficient in this case will be equal to one because there is no horizontal distortion.

After the dimensions of the resulting image have been adjusted, matrix coefficients of a regular (ordinary) perspective transformation can be calculated which then makes it possible to convert coordinates of the original image into coordinates of the straightened out image. Bilinear interpolation may be used to produce a smooth image.

In the case where distorted text-lines are present in a scanned or photographed image of a book or magazine page, one or more sets of collinear elements (e.g., words, characters) in the image can be identified. In the case of the image in FIG. 1B, the collinear elements are words in a line of text. It can be seen that the image in FIG. 1B contains multiple sets of words corresponding to each line of text. The system as described herein can identify these multiple sets of words by analyzing the image (as indicated at the second step 302 in FIG. 3B) and detect possible objects based on the mutual arrangement of black and white dots. On a book page image, these objects are primarily letters, which are subsequently, if possible, separated into words (step 313 in FIG. 3B). FIG. 4A shows words (401) detected on the image shown in FIG. 1B.

Next, the system generates a corrected image based on at least some of the collinear elements (words) in each set by applying a spatial location collection to position all collinear elements (words) in the set on a common horizontal rectilinear baseline in the corrected image. Generating the corrected image involves several steps which are now described. For each detected word or part of a word, its baseline is detected (314). A baseline (402) is the line on which the letters of the given word are located. FIG. 4B shows baselines of the words detected on the image. Next, the detected baselines are approximated for the entire image in order to obtain common baselines or guidelines (315). All words on a common baseline are part of the same set. Thus, the guidelines (403) are the lines that describe the surface of the distorted image. In one embodiment, a point is detected starting from which the dots on the distorted image will be transferred onto the new image (316).

This point lies outside the distorted area, i.e., in the part of the image where the guidelines are horizontal. In order to detect the start point, the system finds a vertical line such that it is perpendicular to the maximum number of guidelines and is closest to the binding edge of the book (405). The middle of this vertical line serves as the start point (404) which is also referred to as the "first start point."

At the next step, an empty image is created and straight horizontal guidelines and the start point (317), which is also referred to as the "second start point" are marked on the image. In one embodiment, starting from the start points on the two images and moving synchronously leftward and rightward along the distorted guidelines of the source image and along the corresponding straight guidelines of the new image, the points on the new image are filled with the values of their corresponding points on the distorted image. Generally, instructions allow a computer program to move along guidelines and copy dots, pixels, etc. from the original (distorted) image to a new image (318). Moving in this manner rightward and leftward along the guidelines, and downward and upward along the vertical line, the new image is populated with the dots of the distorted image. The text lines on the new image are straight 319, as can be seen in FIG. 2B of the drawings as a result of processing the original image shown in FIG. 1B.

Figure 6:
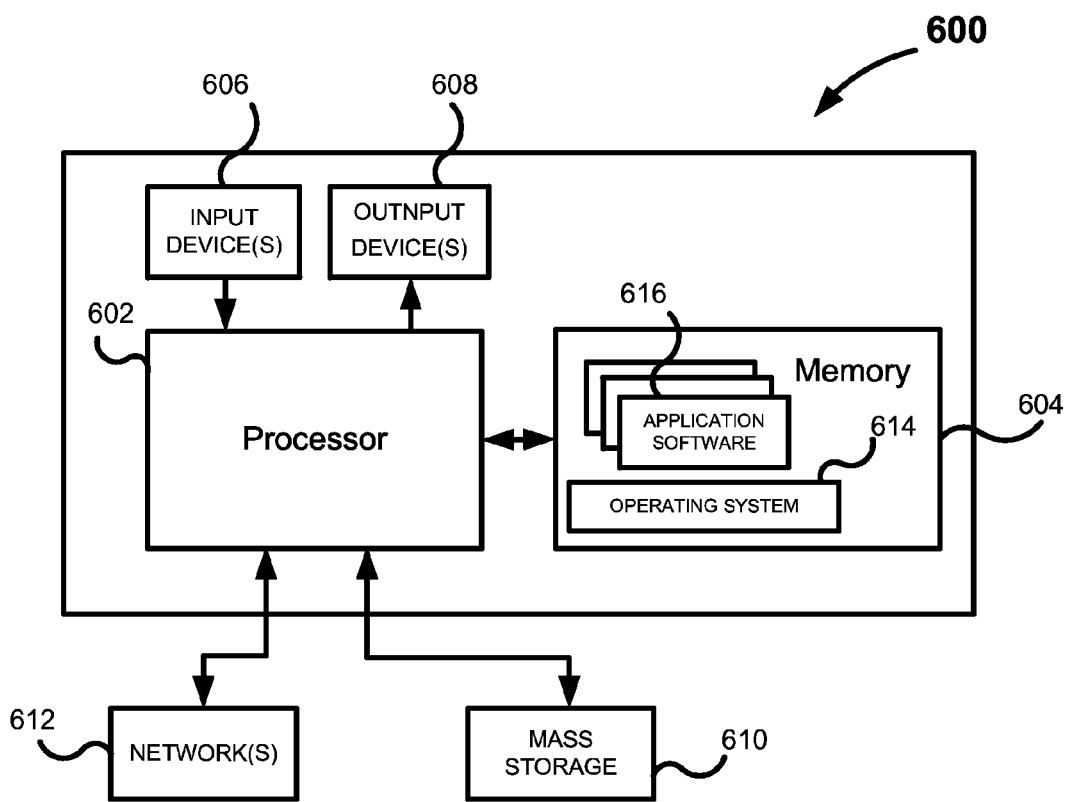
FIG. 6 shows a block diagram of a system for correcting a distorted image, in accordance with one embodiment of the invention.

FIG. 6 of the drawings shows a system 600 for correcting a distorted image using the techniques described above, in accordance with one embodiment of the invention. The system 600 typically includes at least one processor 602 coupled to a memory 604. The processor 602 may represent one or more processors (e.g., microprocessors), and the memory 604 may represent random access memory (RAM) devices comprising a main storage of the system 600, as well as any supplemental levels of memory e.g., cache memories, non-volatile or back-up memories (e.g. programmable or flash memories), read-only memories, etc. In addition, the memory 604 may be considered to include memory storage physically located elsewhere in the system 600, e.g. any cache memory in the processor 602, as well as any storage capacity used as a virtual memory, e.g., as stored on a mass storage device 610.

The system 600 also typically receives a number of inputs and outputs for communicating information externally. For interface with a user or operator, the system 600 may include one or more user input devices 606 (e.g., a keyboard, a mouse, a scanner etc.) and a display 608 (e.g., a Liquid Crystal Display (LCD) panel). For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 600 may include an interface with one or more networks 612 (e.g., a local area network (LAN), a wide area network (WAN), a wireless network, and/or the Internet among others) to permit the communication of information with other computers coupled to the networks. It should be appreciated that the system 600 typically includes suitable analog and/or digital interfaces between the processor 602 and each of the components 604, 606, 608 and 612 as is well known in the art.

The system 600 operates under the control of an operating system 614, and executes various computer software applications, components, programs, objects, modules, etc. indicated collectively by reference numeral 616 to perform the correction techniques described above In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

We claim:

1. A method for correcting a distortion in an image including text, the method comprising:
    generating a first set of substantially straight lines corresponding to a first direction for a quadrangle for the image;
    generating a second set of substantially straight lines corresponding to a second direction for the quadrangle for the image;
    finding a first vanishing point based on said first set of substantially straight lines;
    finding a second vanishing point based on said second set of substantially straight lines;
    identifying the quadrangle for the image based on the first vanishing point and the second vanishing point;
    determining a parameter for a rectangle of a corrected image; and
    reducing the distortion in the image including text by generating the corrected image based on the rectangle at least partially in a memory of a computer device.

2. The method of claim 1, wherein the image corresponds to a page of a document that includes text.

3. The method of claim 1, wherein finding the first vanishing point includes checking a reliability measurement for each of the lines of the first set of substantially straight lines, and using only lines that exceed said reliability measurement when finding the first vanishing point; and wherein finding the second vanishing point includes checking a reliability measurement for each of the lines of the second set of substantially straight lines, and using only lines that exceed said reliability measurement when finding the second vanishing point.

4. The method of claim 1, wherein generating the set of substantially straight lines includes:
    identifying a set of text elements in the image; and
    identifying at least one line based on the set of text elements.

5. The method of claim 4, wherein the text elements are words, and wherein identifying at least one line is determined by steps including:
    identifying a baseline of each said text element;
    join the text elements with nearly collinear baselines in groups of collinear elements; and
    forming a representation of a line based at least in part on approximated baselines of said groups of collinear elements.

6. The method of claim 4, wherein each text element is associated with a point from the rectangle enclosing the text element, wherein each point has a respective weight which is proportional to a respective lateral interval of the text element; and wherein the method further comprises forming a representation of a line based on associated and identified points.

7. The method of claim 1, wherein finding the first vanishing point based on said first set of substantially straight lines includes: filtering the lines of the first set of substantially straight lines based on their length, and using longer lines to find the first vanishing point; and wherein finding the second vanishing point based on said second set of substantially straight lines comprises: filtering the lines of the second set of substantially straight lines based on their length, and using longer lines to find the second vanishing point.

8. The method of claim 1, wherein reducing the distortion in the image by generating the corrected image based on the rectangle includes:
    determining a direction of greatest distortion;
    calculating a first side of the rectangle in a direction associated with the direction of greatest distortion;
    calculating a scale coefficient for a second side of the rectangle; and
    transforming information from the quadrangle for the image into the rectangle by performing a coordinate conversion.

9. The method of claim 8, wherein said transforming the information from the quadrangle for the image includes generating pixels using interpolation to reduce a distortion in a respective character in the text within the quadrangle.

10. The method of claim 1, wherein reducing the distortion in the image further includes straightening out lines of text by generating the corrected image performing steps including:
    moving from a respective starting point in the distorted image, copying pixels from the distorted image to the corrected image, wherein the copying pixels associated with collinear words on common baselines in the image to a respective location on or near a respective rectilinear guideline in the corrected image.

11. A system comprising:
    a processor; and a memory coupled to the processor, the memory storing instructions which when executed by the processor cause the system to perform a method for correcting distortions in a scanned image of a page, the method comprising:

generating a first set of substantially straight lines corresponding to a first direction for a quadrangle for the image;

generating a second set of substantially straight lines corresponding to a second direction for the quadrangle for the image;

finding a first vanishing point based on said first set of substantially straight lines;

finding a second vanishing point based on said second set of substantially straight lines;

identifying the quadrangle for the image based on the first vanishing point and the second vanishing point;

determining a parameter for a rectangle of a corrected image; and reducing the distortion in the image including text by generating the corrected image based on the rectangle.

12. The system of claim 11, wherein the image corresponds to a page that includes text.

13. The system of claim 11, wherein finding the first vanishing point includes checking a reliability measurement for each of the lines of the first set of substantially straight lines, and using only lines that exceed said reliability measurement when finding the first vanishing point; and wherein finding the second vanishing point includes checking a reliability measurement for each of the lines of the second set of substantially straight lines, and using only lines that exceed said reliability measurement when finding the second vanishing point.

14. The system of claim 11, wherein generating the set of substantially straight lines includes:
identifying a set of text elements in the image; and
identifying at least one line based on the set of text elements.

15. The system of claim 14, wherein the text elements are words, and wherein identifying at least one line is determined by steps including:
identifying a baseline of each said text element;
join the text elements with nearly collinear baselines in groups of collinear elements; and
forming a representation of a line based at least in part on approximated baselines of said groups of collinear elements.

16. The system of claim 14, wherein each text element is associated with a point from the rectangle enclosing the text element, wherein each point has a respective weight which is proportional to a respective lateral interval of the text element; and wherein the method further comprises forming a representation of a line based on associated and identified points.

17. The system of claim 11, wherein finding the first vanishing point based on said first set of substantially straight lines includes: filtering the lines of the first set of substantially straight lines based on their length, and using longer lines to find the first vanishing point; and wherein finding the second vanishing point based on said second set of substantially straight lines comprises: filtering the lines of the second set of substantially straight lines based on their length, and using longer lines to find the second vanishing point.

18. The system of claim 11, wherein reducing the distortion in the image by generating the corrected image based on the rectangle includes:
determining a direction of greatest distortion;
calculating a first side of the rectangle in a direction associated with the direction of greatest distortion;
calculating a scale coefficient for a second side of the rectangle; and
transforming information from the quadrangle for the image into the rectangle by performing a coordinate conversion.

19. The system of claim 18, wherein said transforming the information from the quadrangle for the image includes generating pixels using interpolation to reduce a distortion in a respective character in the text within the quadrangle.

20. The system of claim 11, wherein reducing the distortion in the image further includes straightening out lines of text by generating the corrected image performing steps including:
moving from a respective starting point in the distorted image, copying pixels from the distorted image to the corrected image, wherein the copying pixels associated with collinear words on common baselines in the image to a respective location on or near a respective rectilinear guideline in the corrected image.

21. One or more non-transitory computer-readable media having stored thereon instructions, which when executed by a processing system, cause the system to perform a method for correcting distortions in a scanned image of a page, the method comprising:

generating a first set of substantially straight lines corresponding to a first direction for a quadrangle for the image;

generating a second set of substantially straight lines corresponding to a second direction for the quadrangle for the image;

finding a first vanishing point based on said first set of substantially straight lines;

finding a second vanishing point based on said second set of substantially straight lines;

identifying the quadrangle for the image based on the first vanishing point and the second vanishing point;

determining a parameter for a rectangle of a corrected image; and reducing the distortion in the image including text by generating the corrected image based on the rectangle at least partially in a memory of a computer device.

22. The one or more non-transitory computer-readable media of claim 21, wherein the image corresponds to a page that includes text.

23. The one or more non-transitory computer-readable media of claim 21, wherein finding the first vanishing point includes checking a reliability measurement for each of the lines of the first set of substantially straight lines, and using only lines that exceed said reliability measurement when finding the first vanishing point; and wherein finding the second vanishing point includes checking a reliability measurement for each of the lines of the second set of substantially straight lines, and using only lines that exceed said reliability measurement when finding the second vanishing point.

24. The one or more non-transitory computer-readable media of claim 21, wherein generating the set of substantially straight lines includes:
identifying a set of text elements in the image; and
identifying at least one line based on the set of text elements.

25. The one or more non-transitory computer-readable media of claim 24, wherein the text elements are words, and wherein identifying at least one line is determined by steps including:
   identifying a baseline of each said text element;
   join the text elements with nearly collinear baselines in groups of collinear elements; and
   forming a representation of a line based at least in part on approximated baselines of said groups of collinear elements.

26. The one or more non-transitory computer-readable media of claim 24, wherein each text element is associated with a point from the rectangle enclosing the text element, wherein each point has a respective weight which is proportional to a respective lateral interval of the text element; and wherein the method further comprises forming a representation of a line based on associated and identified points.

27. The one or more non-transitory computer-readable media of claim 21, wherein finding the first vanishing point based on said first set of substantially straight lines includes: filtering the lines of the first set of substantially straight lines based on their length, and using longer lines to find the first vanishing point; and wherein finding the second vanishing point based on said second set of substantially straight lines comprises: filtering the lines of the second set of substantially straight lines based on their length, and using longer lines to find the second vanishing point.

28. The one or more non-transitory computer-readable media of claim 21, wherein reducing the distortion in the image by generating the corrected image based on the rectangle includes:
   determining a direction of greatest distortion;
   calculating a first side of the rectangle in a direction associated with the direction of greatest distortion;
   calculating a scale coefficient for a second side of the rectangle; and
   transforming information from the quadrangle for the image into the rectangle by performing a coordinate conversion.

29. The one or more non-transitory computer-readable media of claim 28, wherein said transforming the information from the quadrangle for the image includes generating pixels using interpolation to reduce a distortion in a respective character in the text within the quadrangle.

30. The one or more non-transitory computer-readable media of claim 21, wherein reducing the distortion in the image further includes straightening out lines of text by generating the corrected image performing steps including:
   moving from a respective starting point in the distorted image, copying pixels from the distorted image to the corrected image, wherein the copying pixels associated with collinear words on common baselines in the image to a respective location on or near a respective rectilinear guideline in the corrected image.

31. The method of claim 1, wherein generating the set of substantially straight lines includes:
   identifying an edge of an array of pixels within the image, wherein the array of pixels represents a picture, a figure, a graphic, a table, or a separator; and
   identifying at least one line based on the edge of the array of pixels.

32. The method of claim 1, wherein generating the set of substantially straight lines includes:
   identifying an edge of the image, wherein the edge corresponds to an edge of a document; and
   identifying at least one line based on the edge of the image.

33. The method of claim 1, wherein generating the set of substantially straight lines includes:
   applying a transform to a plurality of values to yield a plurality of transformed values, wherein the plurality of values corresponds to the image;
   calculating a threshold value; and
   identifying at least one line using the threshold value, wherein at least one of the plurality of transformed values is greater than the threshold value, and further wherein at least one of the plurality of transformed values represents the at least one line.

34. The system of claim 11, wherein generating the set of substantially straight lines includes:
   identifying an edge of an array of pixels within the image, wherein the array of pixels represents a picture, a figure, a graphic, a table, or a separator; and
   identifying at least one line based on the edge of the array of pixels.

35. The system of claim 11, wherein generating the set of substantially straight lines includes:
   identifying an edge of the image, wherein the edge corresponds to an edge of a document; and
   identifying at least one line based on the edge of the image.

36. The system of claim 11, wherein generating the set of substantially straight lines includes:
   applying a transform to a plurality of values to yield a plurality of transformed values, wherein the plurality of values corresponds to the image;
   calculating a threshold value; and
   identifying at least one line using the threshold value, wherein at least one of the plurality of transformed values is greater than the threshold value, and further wherein at least one of the plurality of transformed values represents the at least one line.

37. The one or more non-transitory computer-readable media of claim 21, wherein generating the set of substantially straight lines includes:
   identifying an edge of an array of pixels within the image, wherein the array of pixels represents a picture, a figure, a graphic, a table, or a separator; and
   identifying at least one line based on the edge of the array of pixels.

38. The one or more non-transitory computer-readable media of claim 21, wherein generating the set of substantially straight lines includes:
   identifying an edge of the image, wherein the edge corresponds to an edge of a document; and
   identifying at least one line based on the edge of the image.

39. The one or more non-transitory computer-readable media of claim 21, wherein generating the set of substantially straight lines includes:
   applying a transform to a plurality of values to yield a plurality of transformed values, wherein the plurality of values corresponds to the image;
   calculating a threshold value; and
   identifying at least one line using the threshold value, wherein at least one of the plurality of transformed values is greater than the threshold value, and further wherein at least one of the plurality of transformed values represents the at least one line.

* * * * *